(12) United States Patent
Reinicke

(10) Patent No.: US 6,992,552 B2
(45) Date of Patent: Jan. 31, 2006

(54) TORQUE MOTOR

(75) Inventor: Robert H. Reinicke, Mission Viejo, CA (US)

(73) Assignee: Moog Inc., East Aurora, NY (US)

( * ) Notice: Subject to any disclaimer, the term of this patent is extended or adjusted under 35 U.S.C. 154(b) by 0 days.

(21) Appl. No.: 10/969,545

(22) Filed: Oct. 20, 2004

(65) Prior Publication Data

US 2005/0052270 A1    Mar. 10, 2005

Related U.S. Application Data

(62) Division of application No. 10/366,045, filed on Feb. 12, 2003, now Pat. No. 6,894,593.

(51) Int. Cl.
*H01L 51/22* (2006.01)
(52) U.S. Cl. ......................................... 335/78; 336/200
(58) Field of Classification Search ................. 335/78; 336/200, 83, 206–208
See application file for complete search history.

(56) References Cited

U.S. PATENT DOCUMENTS

| 6,492,708 B2 * | 12/2002 | Acosta et al. ............... 257/531 |
| 2002/0097118 A1 * | 7/2002 | Siekkinen et al. ............ 335/78 |
| 2002/0131679 A1 * | 9/2002 | Nasiri .......................... 385/18 |

* cited by examiner

*Primary Examiner*—Lincoln Donovan
*Assistant Examiner*—Bernard Rojas
(74) *Attorney, Agent, or Firm*—Phillips Lytle LLP

(57) ABSTRACT

A torque motor (20) has a base (21), four polepieces (22A, 22B, 22C, 22D) extending away from the base, the polepieces being separated from one another and being arranged at the corners of an imaginary polygon (27), each polepiece terminating in a pole (23A, 23B, 23C, 23D); a coil (24A, 24B, 24C, 24D) surrounding each of the polepieces; an armature (26) pivotally mounted on the base, the armature having a portion arranged to move toward and away from an associated one of the poles, respectively, to define a variable-reluctance air gap ($g_A$, $g_B$, $g_C$, $g_D$) therebetween; a permanent magnet (29) mounted on one of the base and armature and polarized in a direction parallel to the pivotal axis of the armature; and wherein at least a portion of the torque motor is formed by a MEMS technique; whereby the coil may be selectively energized to cause the armature to pivot about its axis.

15 Claims, 6 Drawing Sheets

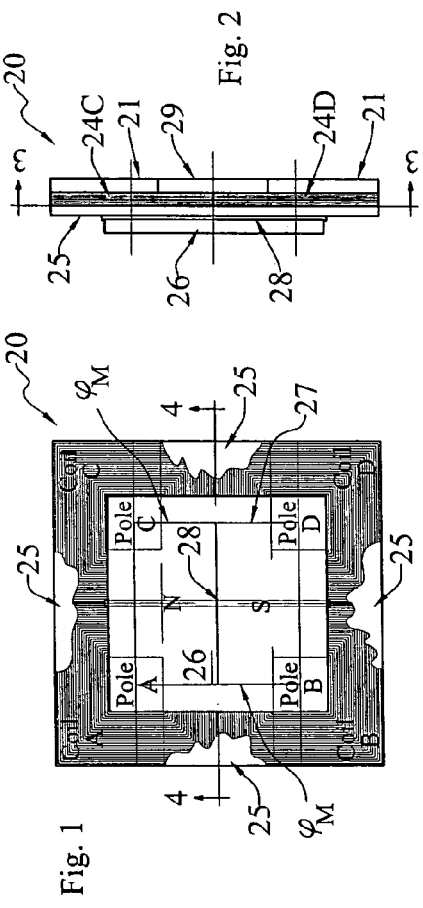
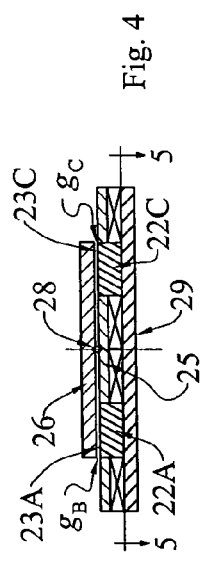
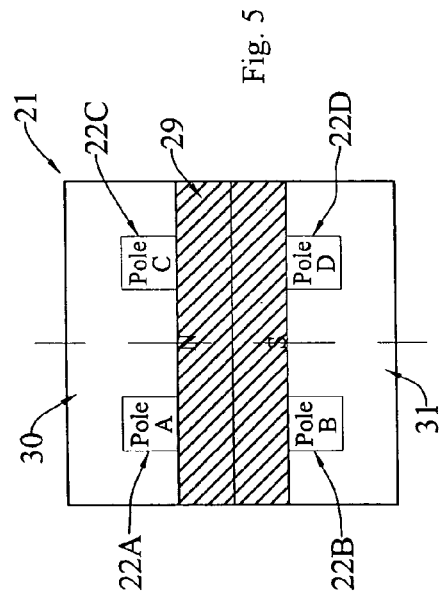
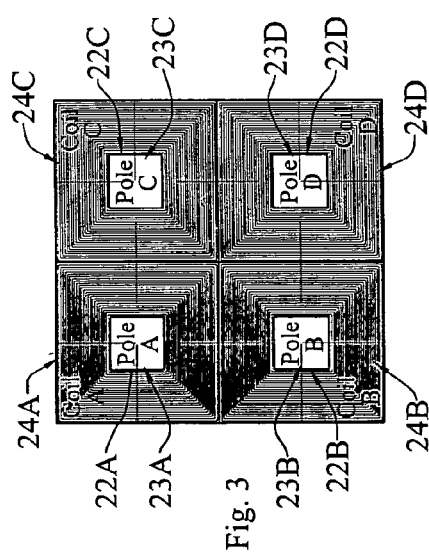

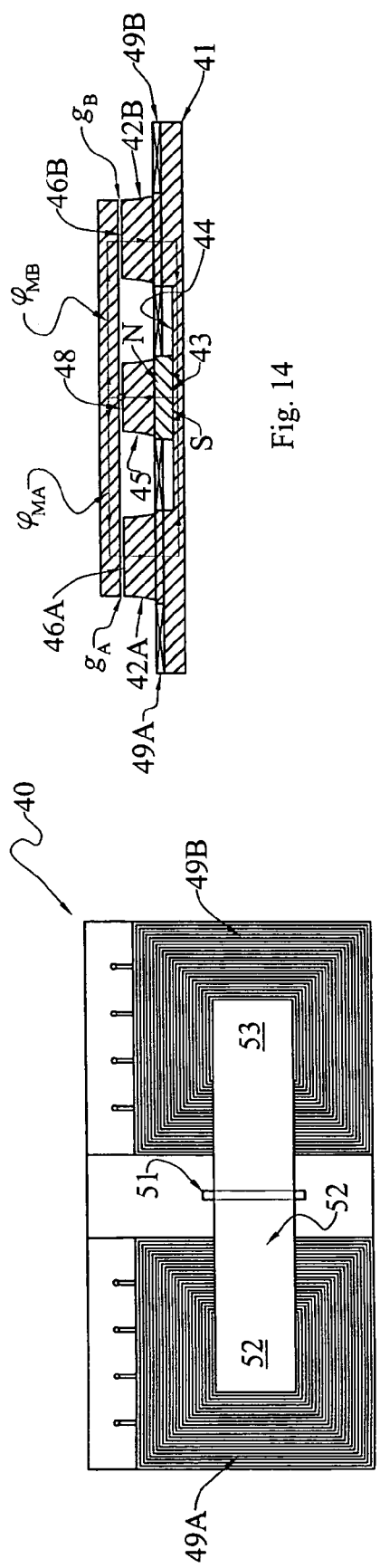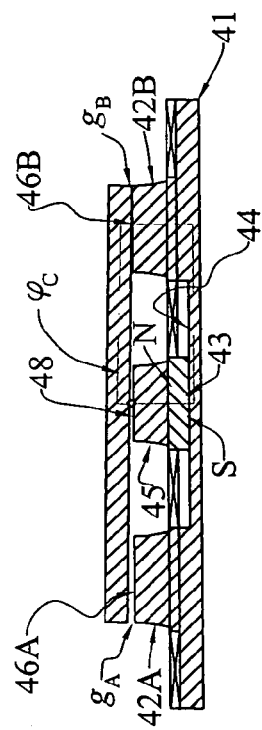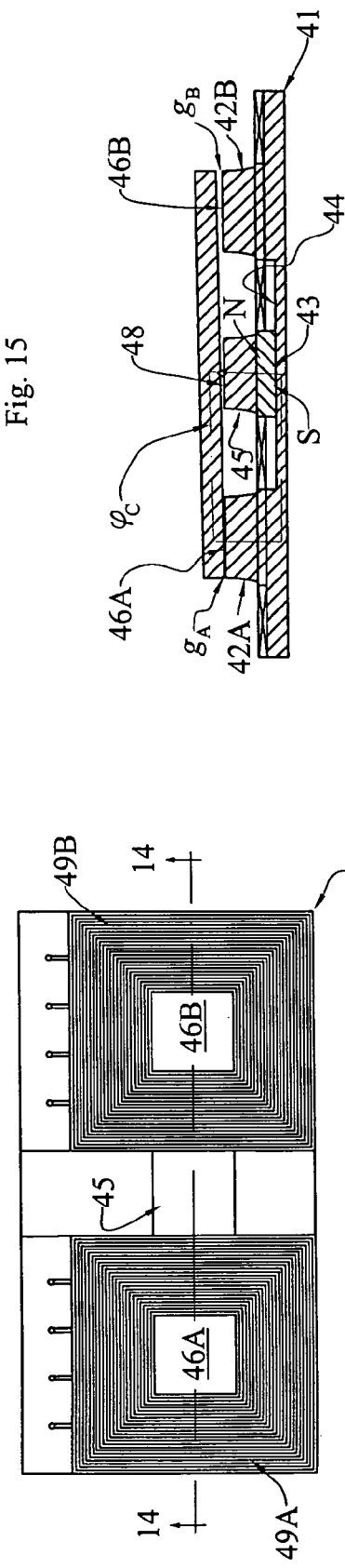
Fig. 12
Fig. 13
Fig. 14
Fig. 15
Fig. 16

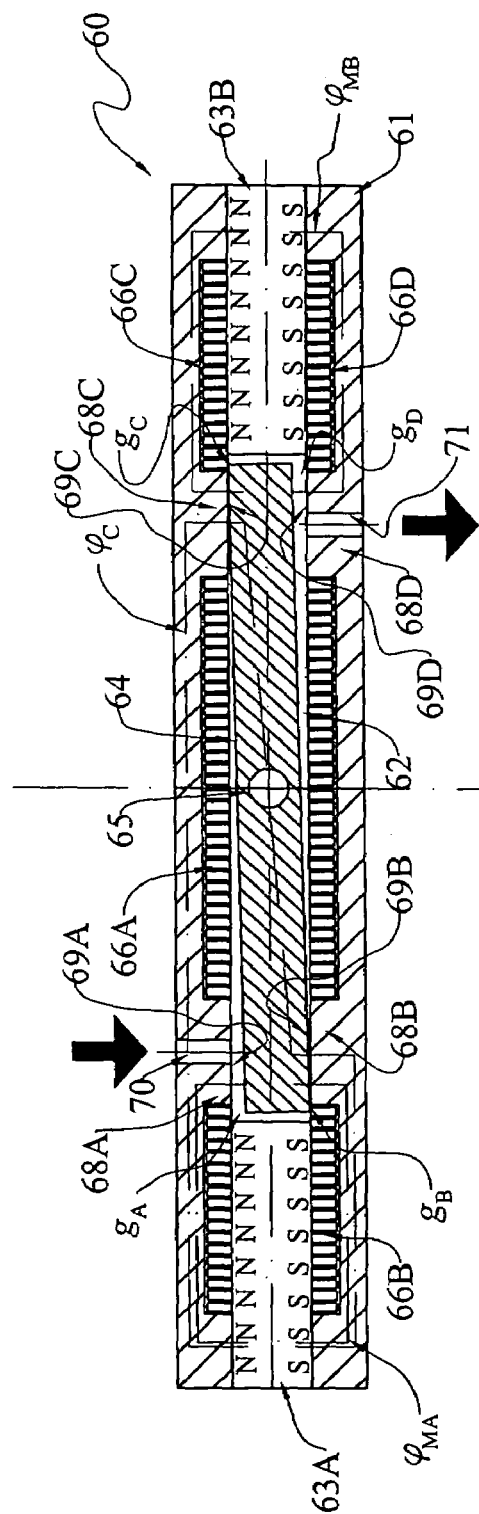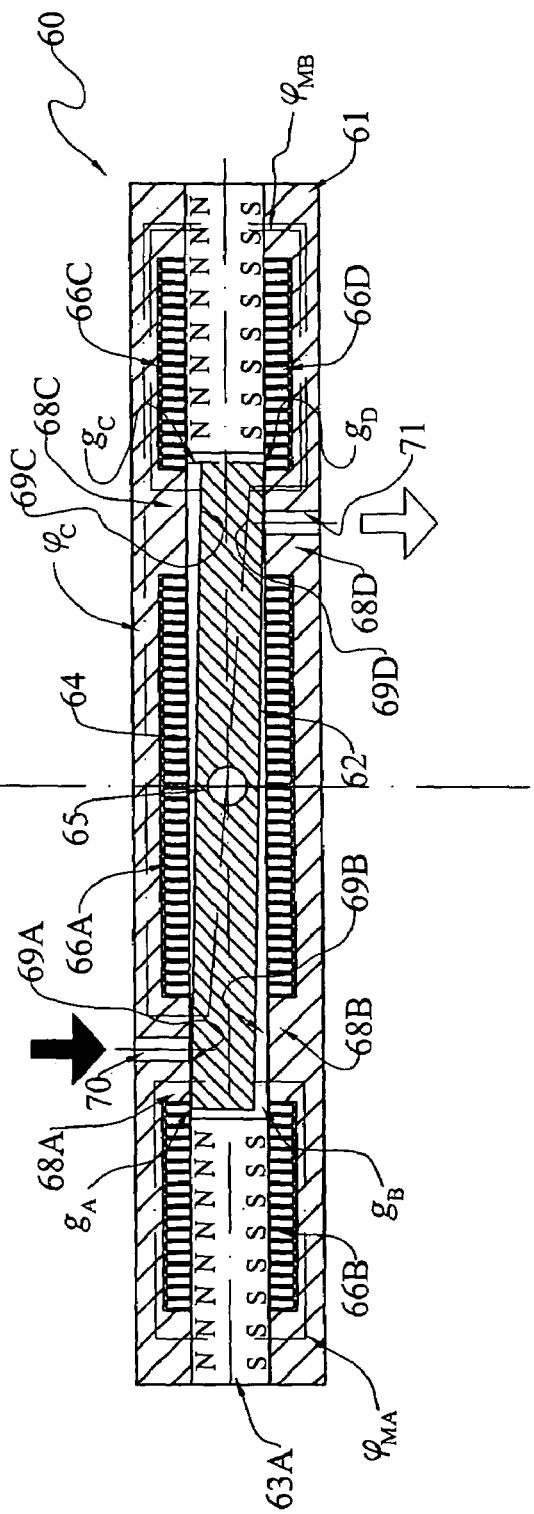
Fig. 17
Fig. 18

TORQUE MOTOR

CROSS-REFERENCE TO RELATED APPLICATIONS

This application is a division of U.S. Pat. application Ser. No. 10/366,045, filed Feb. 12, 2003, now U.S. Pat. No. 6,894,593 for "Torque Motor".

TECHNICAL FIELD

The present invention relates generally to torque motors, and, more particularly, to a miniaturized torque motor having at least a portion thereof formed by a MEMS technique.

BACKGROUND ART

In general, a torque motor is an electromechanical device having a body, an armature, polepieces terminating in poles, a permanent magnet, and at least one coil. Torque motors have various uses, such as in the pilot-stage of an electro-hydraulic servo-valve.

As representatively shown in U.S. Pat. No. 3,023,782, a conventional torque motor has upper and lower polepieces terminating in two pairs of poles, with the opposing poles of either pair being arranged in spaced facing relation to one another. An intermediately-pivoted T-shaped armature is mounted on the body, and has its left and right marginal end portions arranged between the pairs of facing poles to define four variable-reluctance air gaps between the armature and these various poles. The aggregate length of the air gaps in any such cooperative adjacent pair is a constant, with the individual lengths of the respective gaps of any adjacent pair between opposed poles varying in a reciprocal manner (i.e., as one increases in length, the length of its cooperative mate decreases, and vice versa). These air gaps may also be thought of as being arranged in cooperative diagonal pairs such that as the length of one air gap in a diagonal pair increases or decreases (as appropriate), its reciprocal diagonal pair mate will also increase or decrease by the same amount.

A permanent magnet(s) is operatively arranged to create flux in each of the air gaps. The magnitude of the magnet flux (i.e., the flux attributable to the magnet) in any given air gap is a function of the length of that particular gap. Coils surround the marginal end portions of the armature, and are adapted to be selectively energized to create a coil flux (i.e., a flux attributable to the coils) in the various air gaps. The coil flux is superimposed on the magnet flux already present in the air gaps. The total flux in each air gap is, therefore, the algebraic sum of the magnet flux and the coil flux. If the coils are energized with a current of one polarity, the coil flux will be additive with respect to the magnet flux such that the total flux in a particular air gap will be the sum of the magnet and coil fluxes. On the other hand, if the coils are energized with currents of the opposite polarity, the coil flux will oppose and buck the magnet flux in such air gap, and the total flux in such air gap will be the difference therebetween.

The force of attraction between the armature and a pole is inversely related to the length of the air gap therebetween. As the length of such air gap decreases (i.e., as by a proximate portion of the armature moving toward the associated pole), the force of attraction increases. Conversely, as the length of an air gap increases (as by such proximate portion moving away from the associated pole), the force of attraction decreases. Because of this, torque motors are particularly suitable for bistable toggle-like applications where the armature latches against one pole or another. Hence, in a conventional latching-type torque motor, a desired current of one electrical polarity can be momentarily supplied to the coil to selectively move the armature to a hard-over or latched position. Thereafter, the coil can be de-energized, and the armature will remain in such latched position. To move the armature to its opposite position, the coil is energized with a current of opposite electrical polarity. This then causes the armature to pivot from one hard-over position to its opposite hard-over position. After the armature has been moved to this alternative position, the coil can be de-energized, and the armature will remain latched in this alternative position.

It is also known to provide a centering spring that urges the armature to move to a centered position between the poles in the absence of a supplied coil current. In the aforesaid '782 patent, this centering spring was provided by means of a flexure tube. (See, e.g., '782 pat., col. 6, line 42 et seq.) Other types of torque motors are representatively shown and described in U.S. Pat. Nos. 2,767,689, 3,455,330, 3,542,051 and 4,641,072. The aggregate disclosures of each of the aforesaid patents are hereby incorporated by reference insofar as the structure and operation of these various prior art torque motors is concerned.

In recent years, certain manufacturing techniques have been developed in micro electrical mechanical systems ("MEMS"). These techniques apply semiconductor batch-fabrication techniques to produce multiple photomask-defined acid-etched electronic devices on a silicon wafer substrate. Thus, MEMS manufacturing processes enable the fabrication of micro electrical mechanical devices, such as sensors and actuators, in large quantities and at low cost. See, e.g., Petersen, "Silicon as a Mechanical Material", *Proceedings of the IEEE*, Vol. 70, No. 5 (May 1995), and Angell, Terry & Barth, "Silicon Micromechanical Devices", *Scientific American* (April 1983). Hence, whereas conventional torque motors have heretofore been manufactured in large size or macro scale by conventional machining and formulation techniques, it is believed that the developments in MEMS technologies now enables a torque motor to be built on a miniaturized or micro-sized scale.

The desire to produce micro-sized torque motors is now further enhanced by a desire to produce miniaturized components, such as propulsion system for maneuverable satellites and other space vehicles. In addition, it is thought that the application of MEMS technology may allow a large number of parts and components to be manufactured smaller, at higher precision and less expensively than possible with macro-sized devices using conventional machining practices.

DISCLOSURE OF THE INVENTION

With parenthetical reference to the corresponding parts, portions or surfaces of the first embodiment shown in FIGS. 1–11, merely for purposes of illustration and not by way of limitation, a first aspect of the present invention broadly provides an improved torque motor (20).

The improved torque motor broadly includes a base (21); at least two polepieces (22A, 22B, 22C, 22D) extending away from the base, the polepieces being separated from one another with each polepiece terminating in a pole (23A, 23B, 23C, 23D); a coil (24A, 24B, 24C, 24D) surrounding one of the polepieces; an armature (26) pivotally mounted on the base, the armature having a portion arranged to move toward and away from an associated one of the poles to define a variable-reluctance air gap ($g_A$, $g_B$, $g_C$, $g_D$) therebetween; a permanent magnet (29) mounted on one of the base and armature and polarized in a direction substantially perpendicular to the pivotal axis of the armature; and wherein at least a portion of the torque motor is formed by a MEMS technique; whereby the coil may be selectively energized to cause the armature to pivot about the axis.

In another aspect, the torque motor (20) broadly includes: a base (21); four polepieces (22A, 22B, 22C, 22D) extending away from the base, the polepieces being separated from one another and being arranged at the corners of an imaginary polygon (e.g., a square or rectangle), each polepiece terminating in a pole (23A, 23B, 23C, 23D); a coil (24A, 24B, 24C, 24D) surrounding one of the polepieces; an armature (26) pivotally mounted on the base, the armature having a portion arranged to move toward and away from an associated one of the pole, respectively, to define a variable-reluctance air gap ($g_A$, $g_B$, $g_C$, $g_D$) therebetween; a permanent magnet (29) mounted on one the base and armature and polarized in a direction parallel to the pivotal axis of the armature; and wherein at least a portion of the torque motor is formed by a MEMS technique; whereby the coil may be selectively energized to cause the armature to pivot about its axis.

In this preferred embodiment, a coil surrounds each of the polepieces. The coils may be energized momentarily with a current of one polarity to cause the armature to move to one commanded position, and to remain in this position without the coils being thereafter continuously energized. The coils may be energized momentarily with current of the opposite electrical polarity to cause the armature to move to another commanded position, and to remain in this alternative position without the coils being thereafter continuously energized.

In yet another form, a centering spring (e.g., torsional spring 81) may be operatively arranged to bias the armature to move toward an unlatched position in the absence of a current supplied to the coils. At least one of the coils may be used to sense the position of the armature relative to the body. This may be done by superimposing an alternating current on the direct current provided to the coils, and measuring the inductance. Alternatively, one or more separate sensing coils positioned concentrically with the coils can be used. See, e.g., U.S. Pat. No. 4,251,762, which is assigned to the assignee of the present application and which is also incorporated by reference with respect to the sensing and monitoring of the position of the armature.

The magnet (29) may be mounted on the base, and may have upper and lower portions (30, 31) formed of a magnetically-permeable material positioned on opposite sides thereof, with the magnet being polarized to oppositely polarize these portions. In this form, two of the poles are polarized to the polarity of the upper portion, and two of the poles are polarized to the polarity of the lower portion.

In the preferred embodiment, the poles are substantially coplanar, and the armature is arranged as a teeter-totter with respect to the base.

According to another aspect, the invention also provides an improved MEMS technique of forming a miniature coil on a substrate, and the resulting coil-on-a-substrate.

The improved method broadly comprises the steps of: providing a silicon substrate having at least one surface; etching a continuous wound recess into the substrate from the one surface by a deep reactive ion etched technique; forming a dielectric coating on the substrate; and depositing an electrically-conductive material in the recess; thereby to form a coil on the substrate.

In the preferred embodiment, the one surface is substantially planar. The recess has a substantially rectangular transverse cross-section, with a transverse depth-to-width ratio of at least about 10. The transverse cross-section of the recess may be substantially constant along its wound length. More particularly, the recess has a transverse width of about 9 microns (i.e., $9 \times 10^{-6}$ meters), a transverse depth of about 100 microns, with the spacing between adjacent recess convolutions being of the recess is about 5 microns. The dielectric coating may be silicon dioxide, formed by heating the etched substrate in a steam autoclave. This coating may have a thickness of not greater than about 1 micron. The recess may be wound in a generally rectangular pattern.

The process may include the additional step of depositing a layer, such as titanium and copper, in the substrate recess before the electrically-conductive material is deposited thereon. The electrically-conductive material may be copper, and may be electroplated in the recess. The substrate may have a first surface and an opposite second surface, with one of the recesses is etched into the substrate from each of the first and second surfaces. These recesses may be connected so as to be in series with one another.

In another aspect, the invention provides a coil-on-a-substrate, which broadly comprises: a substrate having a first surface and a second surface; a continuous wound first recess extending into the substrate from the first surface; a continuous wound second recess extending into the substrate from the second surface; the second recess communicating with the first recess through a passageway in such a manner that the lengths of the recesses will be connected in series with one another; a dielectric coating provided on the portions of the substrate that face into the recesses and passageway; and an electrically-conductive material in the recesses to form two series-connected oppositely-wound coils.

Each recess may have a substantially rectangular transverse cross-section that is substantially constant along its length. Each recess may have a depth-to-width ratio of at least about 10. The substrate may be silicon, and the dielectric coating may be silicon dioxide. The thickness of the dielectric coating may be not greater than about 1 micron. Adjacent convolutions of each coil may be separated by a nominal distance of about 5 microns. At least a portion of the coil is formed by a MEMS technique. Each recess may be wound in a generally rectangular pattern. The first and/or second surfaces of the substrate may be substantially planar. The conductive material may be copper. The thickness of the substrate between the first and second surfaces may be about 300 microns, and the depth of each recess may be about 100 microns.

Accordingly, the general object of the invention is to provide an improved torque motor.

Another object is to provide an improved miniaturized torque motor having at least a portion formed by a MEMS technique.

Another object is to provide an improved torque motor that has a relatively low profile to facilitate construction by a MEMS technique, and that is adapted to be used with miniaturized parts and components.

Another object is to provide an improved method of forming a coil on a substrate.

Still another object is to provide an improved coil-on-a-substrate.

These and other objects and advantages will become apparent from the foregoing and ongoing written specification, the drawings, and the appended claims.

BRIEF DESCRIPTION OF THE DRAWINGS

FIG. 1 is a top plan view of a first form of the invention, this view depicting a four-pole miniaturized torque motor, showing the plate-like armature as being positioned above the poles, and with portions of the coil-covering plate broken away to illustrate the coils therebeneath.

FIG. 2 is a right side elevation of the torque motor shown in FIG. 1, it being appreciated that FIG. 2 is shown as being in an upright position (i.e., rotated 90° in a counter-clockwise direction) so as to be horizontally aligned with respect to the structure shown in FIG. 1.

FIG. 3 is a fragmentary horizontal sectional view thereof, taken generally on line 3—3 of FIG. 2, with the armature and coil cover plate removed, showing a top plan view of the coils.

FIG. 4 is a fragmentary vertical sectional view thereof, taken generally on line 4—4 of FIG. 1, this view showing the armature as being in a centered or null position such that the lengths of all four air gaps are equal.

FIG. 5 is a fragmentary horizontal sectional view thereof, taken generally on line 5—5 of FIG. 4, this view showing magnetically-permeable material positioned on either side of the permanent magnet, and being oppositely polarized thereby.

FIG. 12 is a top plan view of a second form of the improved torque motor, this form having a horizontally-elongated rectangular plate-like armature mounted for pivotal movement with respect to two poles.

FIG. 13 is a view of the torque motor shown in FIG. 12, with the armature removed.

FIG. 14 is a fragmentary vertical sectional view thereof, taken generally on line 14—14 of FIG. 13, showing the armature in a centered or null position.

FIG. 15 is a view similar to FIG. 14, but showing the armature as having been pivoted off-null in a clockwise direction to one latched position.

FIG. 16 is a view similar to FIG. 14, but showing the armature as having been pivoted off-null in a counterclockwise direction to the opposite latched position.

FIG. 17 is a fragmentary vertical sectional view through a valve embodying the improved torque motor, this view showing the armature as being latched in a counter-clockwise hard-over position to open the valve.

FIG. 18 is a view similar to FIG. 17, but showing the armature as being latched in a clockwise hard-over position to close the valve.

DESCRIPTION OF THE PREFERRED EMBODIMENTS

Figure 6:
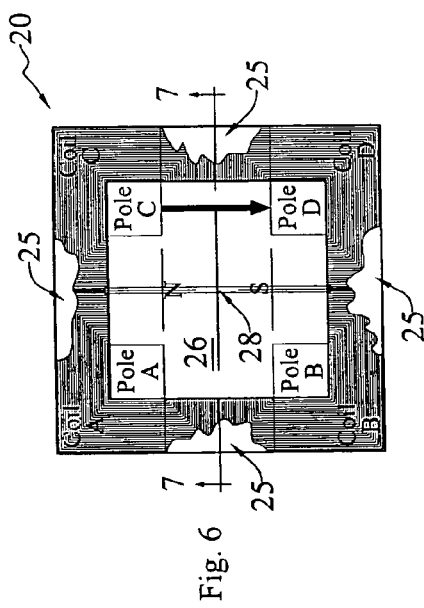
FIG. 6 is a view similar to FIG. 1, but showing the armature as having been pivoted off null in a clockwise direction to one latched position, and further showing a flux path through the armature from Pole C to Pole D.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", "down", "clockwise" and "counter-clockwise", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

First Embodiment (FIGS. 1–11)

Referring now to FIGS. 1–5, a first form of the present invention provides an improved torque motor, generally indicated at 20. The inventive torque motor may be micro-, meso- or macro-sized, as desired.

This torque motor includes a horizontally-disposed square plate-like base 21, with four magnetically-permeable polepieces, severally indicated at 22 and individually identified with suffixes "A", "B", "C" and "D", respectively, rising upwardly therefrom. These polepieces are separated from one another, and are arranged at the corners or apices of an imaginary polygon, such as a square indicated at 27 in FIG. 1. The four polepieces terminate in uppermost pole surfaces, severally indicated at 23, and individually labeled "A", "B", "C" and "D", respectively. In the disclosed embodiment, these four poles are arranged in a common horizontal plane, although this need not invariably obtain.

A coil, severally indicated at 24 and individually identified with suffixes "A", "B", "C" and "D", respectively, surrounds each polepiece 22. These coils are shown as being relatively flat and substantially planar, and are formed on the base by means of a MEMS technique. (See, e.g., U.S. Pat. application Ser. No. US2002/0258547 A1, published Oct. 31, 2002 and U.S. Pat. No. 6,267,905, the disclosures of which are hereby incorporated by reference with respect to the formation of such coils.)

As best shown in FIGS. 1, 2 and 4, a square plate 25 is arranged on top of the coils, and has four rectangularly-spaced square openings positioned to accommodate penetration of the upper margins of the various polepieces. Portions of plate 25 are broken away in FIG. 1 to illustrate the coils therebeneath. The upper surface of plate 25 is substantially coplanar with poles 23A, 23B, 23C and 23D. Plate 25 is formed of a material that is not magnetically permeable, such as aluminum.

An intermediately-pivoted magnetically-permeable plate-like square armature, generally indicated at 26, is mounted on plate 25 by means of a vertically-disposed cylindrical pivot pin 28, which is received in facing V-shaped grooves provided in the plate and armature, respectively. Alternatively, the armature could be supported by a knife edge, a cruciform, a flexure pivot, or the like, as desired. As best shown in FIGS. 1 and 4, marginal end portions of the armature are arranged to overlie the various poles, and define air gaps $g_A$, $g_B$, $g_C$ and $_D$ between proximate portions of the armature and poles 23A, 23B, 23C and 23D, respectively. Thus, the armature is mounted as a teeter-totter with respect to the poles.

In FIGS. 1, 2 and 4, the armature is shown as being in a centered or null position with respect to the poles, such that the lengths of all four air gaps are substantially equal. If the armature were to pivot off-null in a clockwise direction, then the lengths of gaps $g_C$ and $g_D$ would decrease, while the lengths of gaps $g_A$ and $g_B$ would increase. Conversely, if the armature were to pivot off-null in a counterclockwise direction, then the lengths of gaps $g_A$ and $g_B$ would decrease, and the lengths of gaps $g_C$ and $g_C$ would increase.

Referring now to FIG. 5, base 21 is shown as being a horizontally-disposed square plate-like member having a central horizontally-elongated rectangular permanent magnet 29 bounded by horizontally-elongated upper and lower extensions 30, 31. These two lateral portions are formed of a highly magnetically-permeable material, such as Permalloy® (a registered trademark of B & D Industrial and Mining Services, P.O. Box 2384, Jasper, Ala. 35501, used to identify any of several alloys of nickel and iron having high magnetic permeability), and are positioned on opposite sides of magnet 31. The magnet is made of a material that has high magnetic coercive force and high magnetic induction, such as samarium cobalt, capable of being permanently magnetically polarized. Magnet 31 is polarized in the direction indicated by the N-S direction, such that upper extension 30 will be the North pole, and lower extension 31 with be the South pole. Poles 23A and 23C extend upwardly from base upper extension 30, and poles 23B and 23D extend upwardly from right extension 31. Thus, Poles A and C are polarized as being magnetic North, and Poles B and D are polarized as being magnetic South.

Thus, magnet 29 is arranged to create a magnet flux in each of the air gaps. As partially seen in FIG. 1, the magnet flux path $\phi_M$ will include the upper or North pole of magnet 29, upper extension 30, upper polepieces 22A and 22C, upper air gaps $g_A$ and $g_C$, armature 26, lower air gaps $g_B$ and $g_D$, lower polepieces 22B and 22D, lower base extension 31, and the lower South pole of magnet 29. The magnitude of the magnet flux in each air gap is a function of the length of that particular air gap. When the armature is in its centered or null position, such that the lengths of the four air gaps are substantially equal, the magnet flux divides equally between gaps $g_A$-$g_B$ and gaps $g_C$-$g_D$, and the magnitude of the magnet flux in each air gap will be substantially equal. However, should the armature pivot off null in a counter-clockwise direction, the flux in now-shorter left air gaps $g_A$ and $g_B$ will be greater, and the flux in now-longer right air gaps $g_C$ and $g_D$ will be lesser. Conversely, should the armature pivot off null in a clockwise direction, the flux in now-shorter right air gaps $g_C$ and $g_D$ will be greater, and the flux in now-shorter left air gaps $g_A$ and $g_B$ will be lesser.

Figure 7:
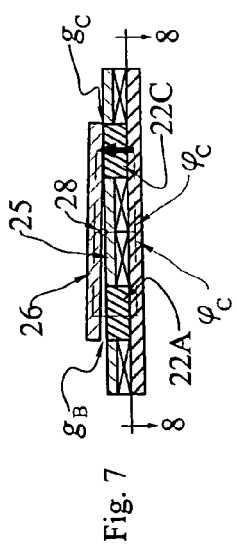
FIG. 7 is a fragmentary vertical sectional view thereof, taken generally on line 7—7 of FIG. 6, showing the flux path through the magnet and the armature.
Figure 10:
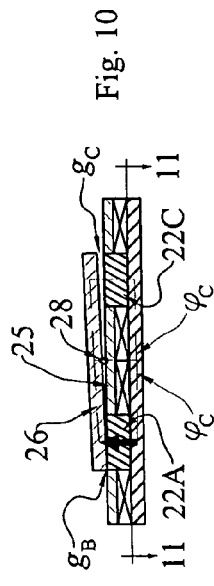
FIG. 10 is a fragmentary vertical sectional view thereof, taken generally on line 11—11 of FIG. 9, showing the flux path from the magnet to the armature.

The coils are typically wired either in series or in parallel so as to create coil flux in the four air gaps. However, whereas the magnet flux passes through all four air gaps, the coil flux will surround the coil that generated it, as shown in FIGS. 7 and 10, being shunted by the magnetically-permeable material. Hence, if the coils are supplied with current of one electrical polarity, the flux of one coil will be in the same direction as the magnet flux such that the net flux in the affected air gaps will be the sum of the two, while the flux of another coil will be in a direction opposite that of the magnet flux such that the net flux in each air gap will be the difference therebetween. In other words, the total flux in any air gap is the algebraic sum of the magnet flux and the coil flux in that air gap, and with the magnitudes of these component fluxes being a function of the length of the air gap and the level and polarity of coil energization.

Figure 8:
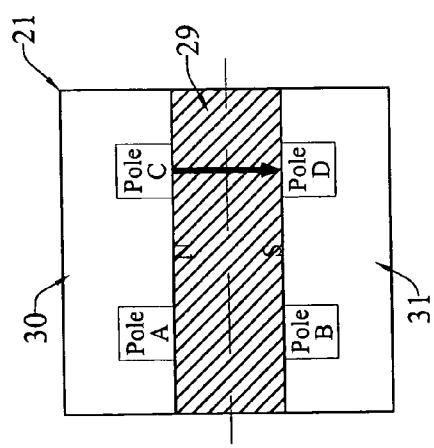
FIG. 8 is a fragmentary horizontal sectional view thereof, taken generally on line 8—8 of FIG. 7, showing the flux path through the base from Pole C to Pole D.
Figure 9:
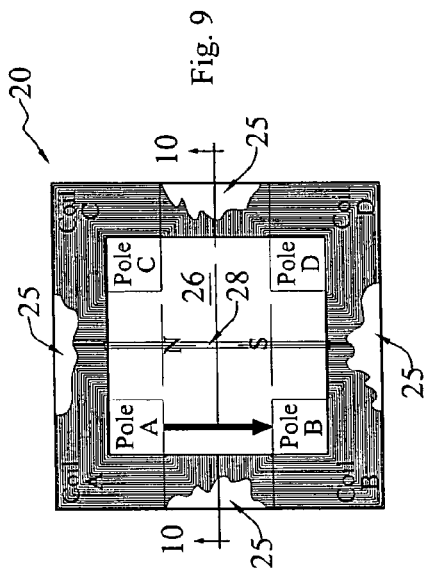
FIG. 9 is a view similar to FIG. 1, but showing the armature as having been pivoted off null in a counter-clockwise direction to an opposite latched position, and further showing the flux path through the armature from Pole A to Pole B.
Figure 11:
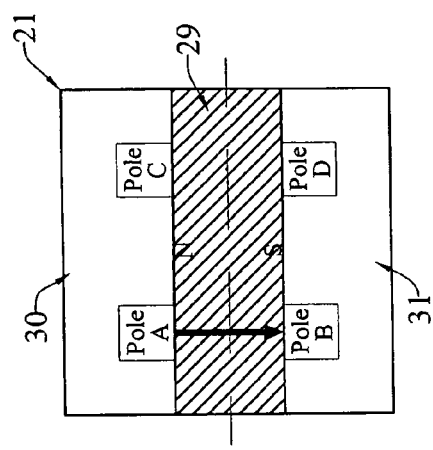
FIG. 11 is a fragmentary horizontal sectional view thereof, taken generally on line 11—11 of FIG. 10, showing the flux path through the base from Pole A to Pole B.

In this manner, the coils may be selectively supplied with a current of appropriate polarity to cause the armature to pivot off-null in either a clockwise direction (as shown in FIGS. 6–8), or counterclockwise direction (as shown in FIGS. 9–11), as desired. Should the armature pivot off null in a counterclockwise direction, the total flux in now-shorter left air gaps $g_A$ and $g_B$ will be greater, and the flux in now-longer right air gaps $g_C$ and $g_D$ will be smaller. Conversely, should the armature pivot off null in a clockwise direction, the total flux in now-shorter right air gaps $g_C$ and $g_D$ will be greater, and the flux in now-shorter left air gaps $g_A$ and $g_B$ will be smaller.

If there is no centering spring, the armature will remain in either latched position after the coil has been de-energized, until a disturbing current of opposite polarity is subsequently applied.

Second Embodiment (FIGS. 12–14)

A second embodiment of the improved torque motor is generally indicated at 40 in FIG. 12.

This torque motor includes a horizontally-elongated rectangular base 41 with two highly magnetically-permeable polepieces, severally indicated at 42 and individually identified with the suffixes "A" and "B" rising upwardly therefrom. A square permanent magnet, indicated at 43, is mounted in a central recess, indicated at 44 in FIG. 14, extending downwardly into the base from its upper surface. Another magnetically-permeable polepiece 45 is mounted on magnet 43 and extends upwardly therefrom. The three pole pieces 42A, 42B, 45, terminate in uppermost coplanar horizontal poles 46A, 46B, 48, respectively. Armature 50 is shown as being a horizontally-elongated rectangular member formed of a magnetically-permeable material. A pivot pin 51 is transversely mounted on the middle pole, and is received in facing V-shaped grooves extending into the armature 52 and into the middle pole piece. The armature has left and right marginal end portions 52, 53, respectively, that are arranged in closely-spaced facing relation to left and right poles 46A, 46B, respectively.

Magnet 43 is polarized in the vertical direction, with the upper surface being the magnetic North, and the lower surface thereof being the magnetic South. Thus, flux attributable to the magnet issues from the North pole, and divides in the armature and passes down through left and right air gaps $g_A$, $g_B$ and polepieces 42A, 42B to return to the South pole through the lowermost portion of the base 41. When the armature is in its centered position with respect to the end poles such that air gaps $g_A$ and $g_B$ are of equal length, the magnet flux ($\phi_{MA}$, $\phi_{MB}$) will divide equally between the two air gaps. However, as shown in FIG. 15, if the armature were to pivot off null in a clockwise direction, the magnet flux flowing through right air gap $g_B$ would be increased at the expense of the flux flowing through left air gap $g_B$. Conversely, as shown in FIG. 16, if the armature were to pivot off null in a counter-clockwise direction such that the length of air gap $g_A$ would be decreased and the length of air gap $g_B$ would be increased, then the magnet flux flowing through left air gap $g_A$ would be substantially increased, at the expense to the flux flowing through the right air gap $g_B$. Flat-wound square coils 49A, 49B, surround the base of polepieces 42A, 42B, respectively. These coils are adapted to be supplied with electrical current to produce a coil flux ($\phi_C$) that will pass through both air gaps. In this regard, magnet 43, which may be formed of samarium cobalt, typically acts as though it were an air gap, and therefore imposes an impediment to passage of magnetic flux.

As with the first embodiment, the armature of the second embodiment is adapted to be latched in either the hard-over left or hard-over right positions. In other words, the coils may be momentarily supplied with current of one electrical polarity to cause the armature to pivot in the appropriate direction. Thereafter, the coil current may be discontinued, and the armature will remain in its latched position. To move the armature from one latched position to its opposite latched position, a current of opposite electrical polarity is supplied. This causes the armature to pivot from one hard-over position to its opposite hard-over position. Once in this alternative position, the coils may be de-energized and the armature will remain in such hard-over position.

Valve Embodiment (FIGS. 17–18)

Referring now to FIGS. 17 and 18, a valve embodying the improved torque motor is generally indicated at 60.

Valve 60 is shown as having a horizontally-elongated rectangular body 61 formed of a magnetically-permeable material. Body 61 has a cavity 62 therewithin. A pair of permanent magnets, indicated at 63A and 63B are mounted in the body cavity. These magnets are polarized in a vertical direction between their North poles (indicated by the letter "N"), and their South poles (indicated by the letter "S").

An intermediately-pivoted armature 64 is mounted within the body for rotational movement about pivot axis 65. A number of recesses extend into the body from recess 62 to receive and accommodate a plurality of coils, severally indicated at 66 and individually identified by the suffixes "A", "B", "C" and "D", respectively. The body has portions, indicated at 68A, 68B, 68C and 68D, extending inwardly of the recess. Polepieces 68A and 68B terminate in poles 69A, 69B, respectively, that are arranged in spaced facing relation to one another. Similarly, poles 68C and 68D terminate in poles 69C, 69D, respectively, that are arranged in spaced facing relation. The armature is shown as having left and right marginal end portions operatively arranged between these facing poles. An inlet passageway 70 is provided through the body and first polepiece 68A, and an outlet passageway 71 is provided through the body and polepiece 68D.

The two magnets, 63A, 63B are operatively arranged to create a magnetic flux path in the proximate air gaps. Thus, left magnet 63A is arranged to create permanent magnetic flux in a path that includes air gap $g_A$ (which is defined between pole 69A and the upper surface of the left margin of the armature), and in air gap $g_B$ (which is defined between pole 69B and the lower surface of the left margin of the armature). Similarly, right magnet 63B is arranged to create a permanent magnet flux in a path that includes air gap $g_C$ (which is defined between pole 69C and the upper surface of the right margin of the armature), and in air gap $g_D$ (which is defined between pole 69D and the lower surface of the right margin of the armature). The flux path about magnet 63a is indicated by $\phi_{MA}$, and the flux path about magnet 63B is indicated by $\phi_{MB}$.

If the armature is simply mounted for free pivotal movement within the body (i.e., without any type of centering spring that would yield to proportional operation), then currents of appropriate magnitude and electrical polarity may be supplied to the various coils to selectively move the armature from one hard-over position to another.

In FIG. 17, the armature is shown as being in a counter-clockwise hard-over position such that fluid may flow into cavity 62 through the inlet, and may flow from the cavity through outlet 71. As indicated above, the armature will remain latched in this position until a disturbing current is sent to the coils.

If a current of appropriate electrical polarity is sent to the coils, the armature may be caused to pivot in a clockwise direction toward an alternative hard-over position, as shown in FIG. 17. In this arrangement, the now-displaced armature will block inflow of fluid through inlet 70 and outflow of fluid through outlet 71. Of course, the armature and/or body may be provided with appropriate cushions and seats to facilitate this sealing arrangement.

Thus, with the arrangement shown in FIG. 4, the valve may be operated by selectively moving the armature between its alternative latched positions to selectively establish flow, or to block flow, as appropriate, through the valve.

Figure 19:
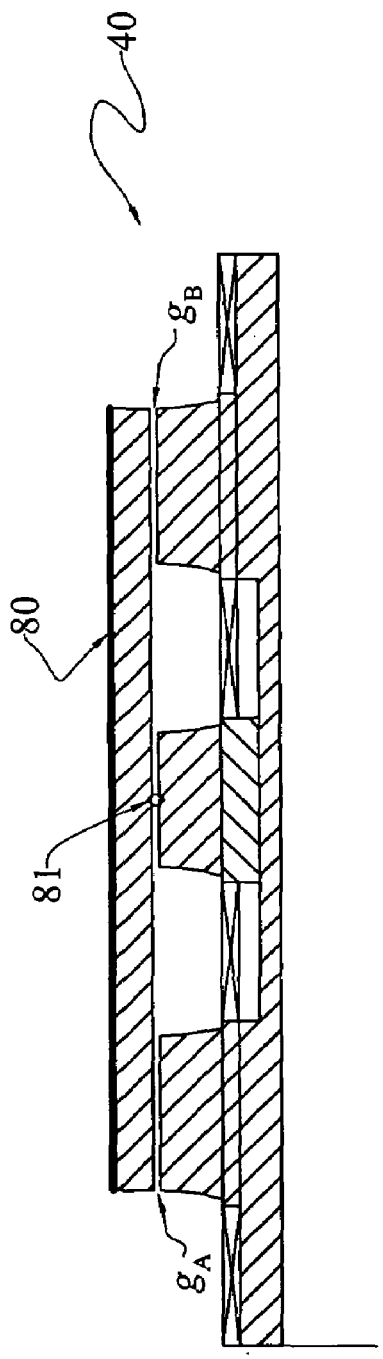
FIG. 19 is a fragmentary vertical sectional view of the torque motor shown in FIG. 14, this view showing the armature as being in a neutral position and as being connected to an adjustable mirror surface.
Figure 20:
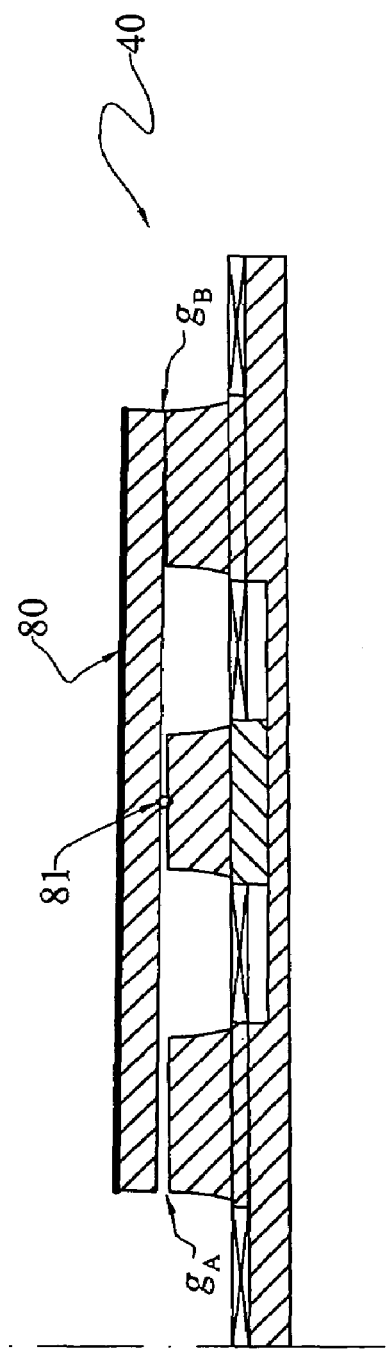
FIG. 20 is a fragmentary vertical sectional view similar to FIG. 19, but showing the armature as having been pivoted in a clockwise direction to one hard-over latched position to change the shape of the mirror.
Figure 21:
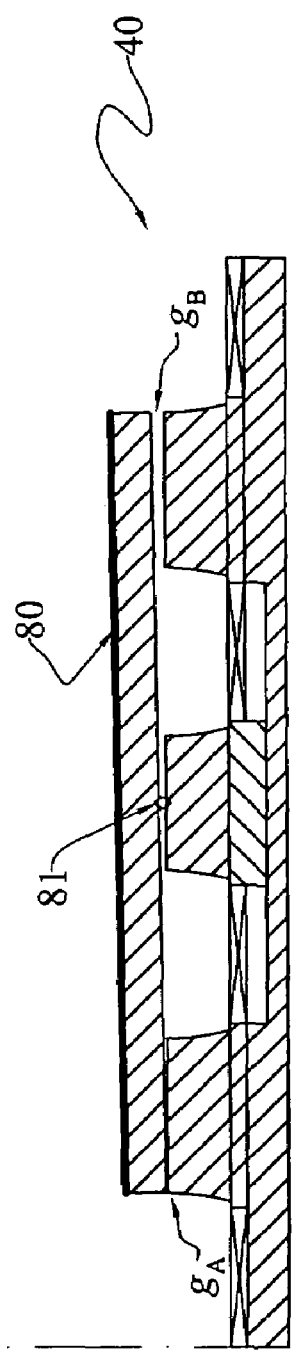
FIG. 21 is a fragmentary vertical sectional view similar to FIG. 19, but showing the armature as having been pivoted in a counterclockwise direction to the opposite hard-over latched position to change the shape of the mirror.

Positional Mirror Arrangement (FIGS. 19–21)

Referring now to FIGS. 19–21, these three views show the torque motor depicted in FIGS. 14–16. Since the structure of this torque motor has been previously described, the same reference numerals are again used to indicate the corresponding parts, portions or surfaces of the previously-described structure. Torque motor 40 is shown as being associated with a flexible mirror-like surface, indicated at 80.

In this form, the simple pivot pin between the armature and the center post is replaced by a torsional spring 81, which continuously urges the armature to move toward the centered or null position, as shown in FIG. 19. Thus, in the absence of a disturbing current supplied to the coils, the armature will be in this centered positioned at which the length of air gaps $g_A$ and $g_B$ are equal.

A current of one electrical polarity may be supplied to the coils to selectively cause the armature to pivot in a clockwise direction, as shown in FIG. 20. If pin 81 were a simple pivot pin, the armature would remain in this latched position. However, if pin 81 is a torsional spring, then current must be continuously supplied to the coil to hold the armature in this displaced position. In FIG. 20, the armature is shown as being in a hard-over clockwise position. FIG. 20 also illustrates that there has been a change in the position of the mirror 80 attributable to this clockwise motion of the armature.

FIG. 21 illustrates the opposite situation when a current of appropriate electrical polarity is supplied to the coils to pivot the armature in a counter-clockwise direction. In the form shown, the armature is in a hard-over counter-clockwise position. Here again, if a simple pivot pin were to be used between the armature and the middle pole piece, the armature would remain in such latched position when the coils are de-energized. However, if a torsional spring is used, then current of the appropriate polarity must be continuously supplied to the coils to hold the armature in a displaced position.

As is well known in this art, the use of a torsional spring, such as indicated at 81, affords the capability of proportional operation with the position of the armature being a linear function of the magnitude of the supplied current, and with the direction of armature movement being a function of the polarity of such current.

Thus, FIGS. 19–20 illustrate the use of the improved torque motor to controllably vary the position of an appropriate object, such as a deflectable mirror. These figures also illustrate the potential use of a torsional spring to cause proportional operation.

Figure 23:
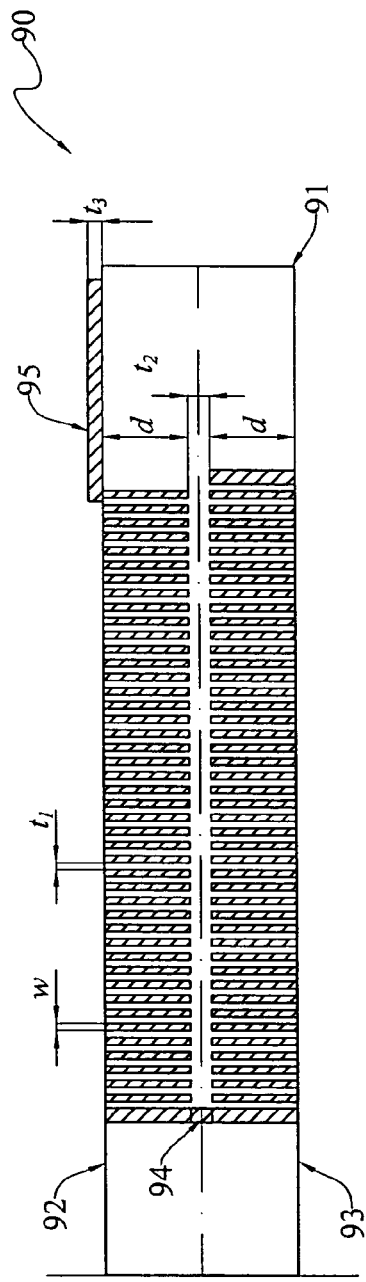
FIG. 23 is a greatly-enlarged fragmentary vertical sectional view, taken generally on line 23—23 of FIG. 22, through the improved coil on a substrate.
Figure 22:
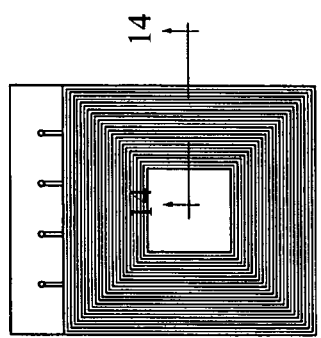
FIG. 22 is a reduced-scale view of a square-wound coil, as shown in FIG. 13.

Improved Coil-on-a-Substrate and Method of Forming Same (FIGS. 22–23)

The present invention also provides an improved method of forming a coil on a substrate, and the resulting coil-on-a-substrate formed thereby.

Heretofore, state-of-the-art multi-turn electromagnetic MEMS coils have been customarily made by electroplating copper onto a trenched substrate of material known as SU-8. SU-8 is an epoxy-based negative photo resist material produced by MicroChem Inc., of Newton, Mass., and Sotec Microsystems, located in Switzerland, reportedly under U.S. Pat. No. 4,882,245. The unique property of SU-8 is that micro-sized features, such as trenches with depth-to-width ratios in excess of 20 and vertical sidewalls can be obtained using standard contact UV exposure lithography procedures and equipment. SU-8 is well suited for acting as a mold for electroplating because of its relatively high thermal stability and chemical inertness. In addition to being highly resistant to solvents, acids and bases, SU-8 is a good dielectric, making it well suited for use as an electroplating mold. The use of SU-8 is recorded in Hung-Pin Chang et al., "A Novel Technique for Fabrication of Multi-Layered Micro Coils in Micro Mechanical Systems (MEMS) Applications", 2002 SPIE Smart Materials Conference, San Diego, Calif. (March 2002).

However, as efforts have been directed toward increasing the efficiency of such coils into larger coils, it has found that this technique creates certain problems when the known process is used to formulate coil forms on a meso scale (i.e., a miniature device that has one or more planar dimensions $\geq 50$ microns). Attempts to form trenches in the SU-8 material substrate having depths of about 75 microns and widths of about 9 microns have produced wavy trench walls. In other words, an attempt to formulate a desired trench width of 9 microns has produced an actual trench width of about 7 microns, and the desirable wall thickness between adjacent trenches has varied by almost 25% of that intended. In other words, the use of this known technique to form deep and closely-spaced trench convolutions has been ineffective, and has produced considerable waviness in the trench walls. Such waviness can cause non-continuous vapor deposition of a titanium-copper pre-electroplate seed layer, incomplete copper filling of the trench during electroplating, incorrect coil resistance, or hot spots that could led to coil failure. A possible "fix" for this problem could be to increase the width of the SU-8 walls between the adjacent trenches to make them stiffer. However, this would introduce major volumetric packaging inefficiency, causing the size of the coil to increase well beyond a feasible and practical size.

Figure 24:
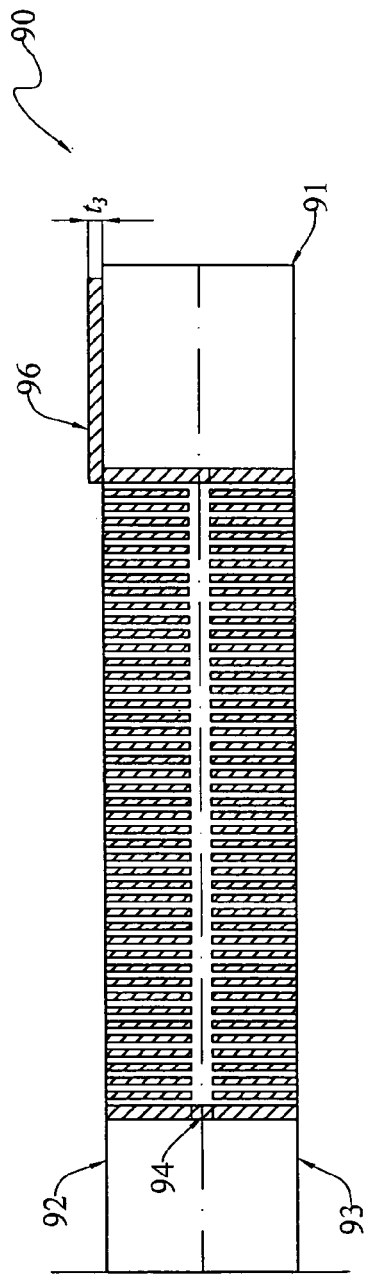
FIG. 24 is another view of the coil on a substrate shown in FIG. 23, showing the other contact terminal.

FIG. 21 is a reduced-scale top plan view of a square-wound coil, such as shown in FIG. 13. An improved process has been found by the use of a straight silicon wafer, that is deep reactive ion etched ("DRIE") with wound trenches, instead of using the previously-described process used with SU-8. This improved process is believed to provide stiffer sidewalls that can be made much thinner than with the SU-8 material, improving the copper turn density in a given planar area. Moreover, the number of coil turns can be easily be doubled by providing DRIE trenches on both sides of the wafer, as shown in FIGS. 23 and 24. In FIG. 23, an improved coil-on-a-substrate, generally indicated at 90, is shown as having a silicon wafer 91 having a planar horizontal upper surface 92 and a planar horizontal lower surface 93. A plurality of wound trenches are DRIE etched into the surface from each of surfaces 92 and 93. The inner surface is thickened, and is joined by a via 94. The outermost trench is connected to an contact terminal 95. In FIG. 23, another portion of the terminal is provided with another outlet terminal 96.

The trenches are etched into the substrate from both surfaces, and are connected via bus 94 so as to be connected to be continuous in their connected length; i.e., to be arranged in series with one another. After the trenches have been formed, the trenched wafer is placed in a steam autoclave to form a silicon dioxide coating in the silicon trenches, which serves as an electrical insulation between the copper coils and the silicon. It must be remembered that silicon is a semiconductor, even when highly doped. Thereafter, a seed layer of titanium/copper (100 nm/200 nm thick) is vapor-deposited in the bottom of all of the trenches. Finally, the various trenches are electroplated-filled with copper at the same time.

The walls between the trenches can be 5 microns or less, and the walls will remain substantially planar and vertical without any sign of waviness. DRIE trenches having a transverse width of 9 microns and a depth of 100 microns have been formed without any significant waviness. In other words, the transverse cross-sectional area of the trenches, and hence that of the copper material electroplated therein, will be substantially constant along the combined lengths of the two trenches. This allows the improved coil to have an improved volumetric packing efficiency. In other words, a greater number of turns may be obtained in a smaller space. If the number of turns is doubled, this provides a four-fold actuating force increase in the same planar area die and at the same power. As indicated above, it is necessary that the coils be wound in opposite directions so that their ampere-turns will be additive. If this were not done, the ampere-turns of the coils would effectively cancel one another.

Thus, the improved method of forming the coil-on-a-substrate has a number of advantageous. First, it extends the coil batch processing benefits to meso-scale devices. Secondly, it prevents sidewall trench waviness along the length of the trench. It allows the sidewall between adjacent convolutions to be thinner, so as to increase the volumetric packing efficiency. It ideally allows the use of double-sided construction, such as shown in FIGS. 23 and 24, that allows the number of turns to be readily doubled. It allows the use of easily-accessible contact terminals. Each coil may be produced as a separate parallel-processed wafer module, which avoids series-processing and reduces the production mortality rate in led time. In addition, the high thermal conductivity of silicon facilitates heat dissipation to keep the coil temperature lower, to increase coil reliability and to extend coil life. Moreover, multiple wafers can easily be stacked on top of one another and bump-bonded together to increase the number of coil turns.

Thus, the invention also provides an improved method of forming a coil on a substrate, and the resulting coil-on-a-substrate formulated by this method.

Modifications

The present invention contemplates that many changes and modifications may be made. For example, unless otherwise indicated in the claim per se, the substrate may be any dielectric material. The magnets are preferably permanently magnetized. These magnets may be formed of samarium cobalt, or some other material. The coils may be square-or rectangular-wound, or may be spirally wound, as desired. The armature may be mounted on the body as a teeter-totter so as to latch at either pivotal position. Alternatively, one or more centering springs or torsional springs may be employed so that armature position will be proportional to the magnitude of the current supplied to the coils. The improved torque motor may be utilized in a valve, a pivotal positioning apparatus, an electrical relay, or in some other device. Of course, suitable feedback mechanisms may be provided so as to achieve closed-loop servo-control of the armature position.

The invention also provides an improved method of formulating a coil-on-a-substrate which allows the use of deep and closely-positioned trenches so as to increase the number of ampere-turns in a given volume.

Therefore, while several forms of the invention have been shown and described, and various changes and modifications thereof discussed, persons skilled in this art will readily appreciate that various additional changes and modifications may be made without departing from the spirit of the invention, as defined and differentiated by the following claims.

What is claimed is:

1. The method of forming a coil on a substrate, comprising the steps of:
    providing a one-piece silicon wafer substrate having a first surface and a second surface;
    etching a continuous wound recess into said substrate from said first surface by a deep reactive ion etched technique;
    etching a continuous wound recess into said substrate from said second surface by a deep reactive ion etched technique;
    forming a dielectric coating on the portions of said substrate that face into said recesses; and
    depositing an electrically-conductive material in said recesses to form two series-connected oppositely-wound coils;
    thereby to form a coil on said substrate.

2. The method as set forth in claim 1 wherein each surface is substantially planar.

3. The method as set forth in claim 1 wherein each recess has a substantially rectangular transverse cross-section.

4. The method as set forth in claim 3 wherein each recess has a transverse depth-to-width ratio of at least about 10.

5. The method as set forth in claim 1 wherein each recess has a transverse width of about 9 microns.

6. The method as set forth in claim 1 wherein each recess has a transverse depth of about 100 microns.

7. The method as set forth in claim 1 wherein the spacing between adjacent convolutions of each recess is about 5 microns.

8. The method as set forth in claim 1 wherein said dielectric coating is silicon dioxide.

9. The method as set forth in claim 8 wherein said silicon dioxide coating is formed by heating said etched substrate in a steam autoclave.

10. The method as set forth in claim 1 wherein said coating has a thickness of not greater than about 1 micron.

11. The method as set forth in claim 1 wherein each recess is wound in a generally rectangular pattern.

12. The method as set forth in claim 1 and further comprising the additional step of:
    depositing a seed layer in each recess before said electrically-conductive material is deposited thereon.

13. The method as set forth in claim 12 wherein said seed layer includes titanium and copper.

14. The method as set forth in claim 1 wherein said electrically-conductive material is copper.

15. The method as set forth in claim 14 wherein said copper material is electroplated in said recess.

* * * * *